No. 853,111. PATENTED MAY 7, 1907.
D. D. OGILVIE.
HAY STACKER.
APPLICATION FILED JUNE 13, 1906.
2 SHEETS—SHEET 1.
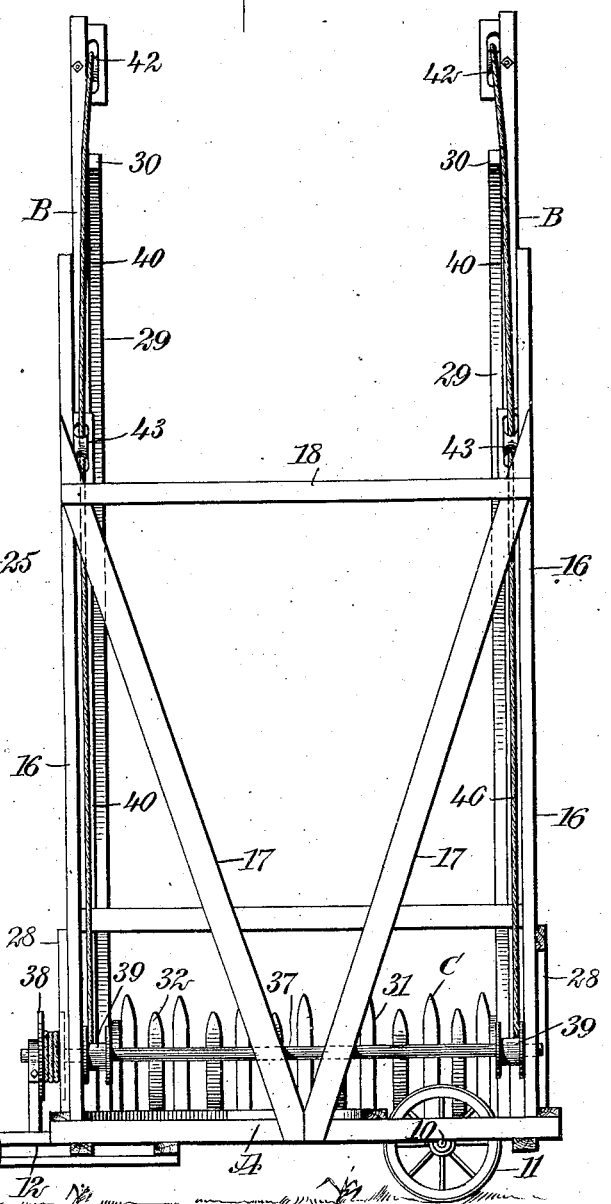
WITNESSES
INVENTOR
David D. Ogilvie
BY
ATTORNEYS No. 853,111. PATENTED MAY 7, 1907.
D. D. OGILVIE.
HAY STACKER.
APPLICATION FILED JUNE 13, 1906.
2 SHEETS—SHEET 2.
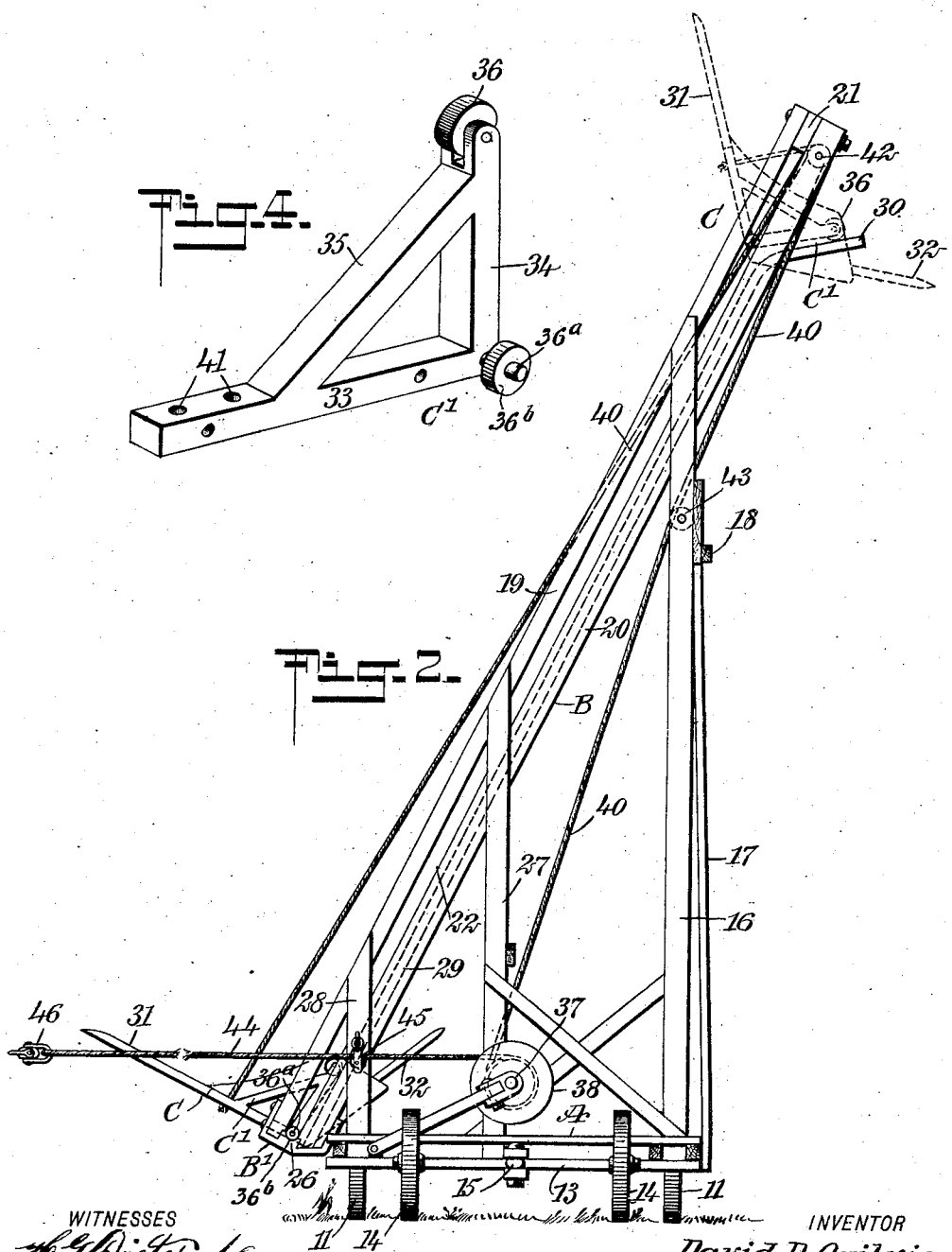
WITNESSES
INVENTOR
David D. Ogilvie
BY
ATTORNEYS

UNITED STATES PATENT OFFICE.

DAVID D. OGILVIE, OF LEE, NEVADA.

HAY-STACKER.

No. 853,111.  Specification of Letters Patent.  Patented May 7, 1907.

Application filed June 13, 1906. Serial No. 321,535.

*To all whom it may concern:*

Be it known that I, DAVID D. OGILVIE, a citizen of the United States, and a resident of Lee, in the county of Elko and State of Nevada, have invented a new and Improved Hay-Stacker, of which the following is a full, clear, and exact description.

The purpose of the invention is to provide a very simple, durable, economic and effective form of hay stacker, adapted especially for stacking hay from buck rakes, and to so construct the machine that the fork conveyer can be speedily and conveniently raised and lowered, and wherein when said conveyer reaches the highest point in its ascent it will automatically discharge its load in such manner as to deliver the hay to the middle of the stack, rather than at one side as most stackers do.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the machine; Fig. 2 is a front elevation thereof; Fig. 3 is a detail perspective view of a lower bearing shoe for the conveyer; and Fig. 4 is a detail perspective view of one of the side guide arms of the conveyer.

The base A of the frame of the machine is usually rectangular and of skeleton form, and may be constructed in any suitable or approved manner. The frame is shown provided with a rear axle 10, the wheels 11 on said axle being within the line of the side sills of the frame. At the forward portion of the base of the frame an extension structure 12 is formed, in which structure the forward axle 13 is pivoted, being provided with forward wheels 14, and a tongue or pole 15 is connected with said axle. But I desire it to be understood that instead of wheels being employed to support the frame of the machine, kids or runners may be used if desired.

At the right-hand side of the machine, viewed from the front standards 16 are carried up from the forward and rear end portions, which standards may be of any desired type, and said standards are provided with braces 17 which extend from their upper portions downward in V-form to the said left-hand side of the base as is shown in Fig. 1, and these diagonal braces 17 are connected at the top by a transverse brace 18.

At the opposite or left-hand side of the base of the frame guide bars B are located, one guide bar being at the forward portion and the other at the rear portion of the base, and the lower ends of the guide bars extend a desired distance down at the left-hand side of said base, as shown in Fig. 2. The guide bars B are preferably constructed as shown in Fig. 2, wherein they consist of two parallel members 19 and 20 connected at the top by a block 21 in such manner as to form a longitudinal space 22 between the members of uniform width, which space extends out to the lower ends of the said members.

The bottom of each guide bar B is provided with a bearing shoe B' shown in detail in Fig. 3. This bearing shoe is of metal and consists of a body bar 23, adapted to engage with the lower ends of the members of said guide bars, and upright end members 24 and 25, which are bolted or otherwise secured to the outer faces of the members of the said guide bars as is illustrated in Fig. 2; and an open bearing 26 is made integral with the body member 23 at such point between the upright members 24 and 25 that when the shoe B' is in position on the guide bar B the bearing 26 will form the bottom portion of the space 22.

The guide bars B incline upward and in direction of the right-hand side of the machine, and are supported at their upper portions by the aforesaid standards 16. The upper portions of the said guide bars extend some distance rearward and upward beyond the upper portions of said standards 16. The guide bars B are further supported by centrally located uprights 27 at the front and rear of the base, and by shorter uprights 28 at the left-hand side of the base, as is best shown in Fig. 2.

A rail 29 is secured to the inner face of the lower member 20 of each guide bar B, the said rail being a certain distance below the lower edge of a space 22 in a guide bar, as is best shown by dotted lines in Fig. 2; and the upper end 30 of the said rail is given a slightly upward curvature or inclination, and this curved section extends beyond the right-hand longitudinal edge of the guide bar to which the rail is secured.

In connection with the guide bars B a conveyer C is employed. This conveyer is in the form of a hay fork, consisting of longitudinal body bars and two series of teeth 31 and 32, which are at angles to each other and extend from opposite longitudinal edges of the body bar. The teeth 31, which extend in direction of the left-hand side of the machine are the longest, and are adapted to receive the hay as the conveyer is loaded; and the teeth 32, which face to the right, are shorter and constitute the discharging or dumping teeth for the conveyer.

In connection with the fork conveyer just described I employ guide arms C', which are located at the front and rear ends of the said conveyer. One of these guide arms is shown in detail in Fig. 4, and consists of a base or body bar 33 adapted to be attached to the outer faces of the end teeth of the series 31, as is shown in Fig. 2, and an upright member 34 located at the inner end of the base member 33, being at right angles to said base member. These two members 33 and 34 are strengthened by an upper diagonal member 35. The vertical member 34 of the guide arm C' is bifurcated at the top to receive a friction roller 36, and when the guide arms are in position on the fork conveyer the rollers 36 are in engagement with the rails 29, so that as the conveyer is raised and lowered the said rollers 36 travel on the said rails. Each guide arm C' at the junction of its members 33 and 34 is provided with an outwardly-extending pin 36$^a$ and a roller 36$^b$ thereon, and before the bearing shoes B' are placed in position on the guide bar B these pins 36$^a$ are made to enter the spaces or slots 22 in the said guide bars.

A shaft 37 extends centrally from front to rear of the machine a suitable distance above the base, being journaled in suitable bearings usually carried by the intermediate uprights 27; and this shaft is provided at its forward end with a drum 38. Near each end of the shaft within the framework of the machine, two other drums 39 are secured thereto, which need not be as large as the outer drum 38. Cables 40 are secured at one of their ends to the outer end portions of the base or body members 33 of the guide arms C', suitable openings 41 being made in such portions of the arms as is illustrated in Fig. 4. These cables are then carried up over pulleys 42, which are supported at the inner faces of the guide bars B at their inner ends, and said cables are then carried downward over guide pulleys 43 mounted upon the inner faces of the left-hand standards 16 near the top, and finally the other ends of the cables 40 are secured one cable to each drum 39.

A cable 44 is attached to the larger drum 38, and this cable passes over a guide pulley 45, carried by one of the left-hand uprights or standards 28, and a draft tree 46 is secured to the free end of this cable.

In the operation of the machine, the fork conveyer having been loaded, the horse attached to the cable 44 is started to walk away from the machine, whereupon the drum 38 will be turned, and will cause the shaft 37 to revolve in a direction to wind the cables 40 on the drums 39, thus elevating the fork conveyer C. When the fork conveyer reaches the upper portion of the conveyer bars B, the friction rollers 36 will follow the rails 29, and when the inclined outwardly-extending portions 30 of said rails are reached the weight of material in the conveyer will cause it to tilt downward in direction of the rear and will deliver its load onto the central portion of the stack.

Having thus described my invention, I claim as new, and desire to secure by Letters Patent,—

1. In a hay stacker, a base frame, slotted guide bars inclined from the left-hand side portions of the base upward in direction of the right-hand side, rails secured to the inner faces of the guide bars adjacent to the lower edges of the slots therein, the rails at their upper ends being upwardly inclined, extending beyond the right-hand side of the guide bars, a fork conveyer provided with friction rollers which engage with the said rails and with pivot pins which pass through the slots in the bars, and a windlass device for raising and lowering the said fork conveyer, which fork conveyer automatically dumps when its guide rollers reach the inclined extended portions of the rails.

2. In a hay stacker, the combination with a base and parallel guide bars located at the front and at the rear, said guide bars being inclined from the left-hand side upwardly beyond the right-hand side of the base, each guide bar being provided with a longitudinal slot, and rails located on the inner faces of the guide bars adjacent to the lower walls of the said slots, which rails at their upper ends extend beyond the right-hand side of the guide bars and have a slight upward inclination, of a fork conveyer having series of teeth facing in opposite directions, the teeth of one series being at an angle to the teeth of the other series, an angular guide arm secured to the outer teeth of a series where the series of teeth connect, a member of the said guide arm extending upward from the teeth parallel with the said rails when the said conveyer is in receiving position, friction rollers carried by the said upwardly-extending members of the guide arms, pins also carried by the guide arms at the junction of their members, said pins being adapted to pass through the slots in the guide bars, the said friction rollers being adapted to travel along the rails of the guide bars the length thereof, causing the conveyer to automatically dump when the upper inclined portions of the rails are reached, a shaft, drums secured to said shaft, cables attached to the conveyer at its receiving portion, said cables being attached to the said drums, roller guides for the cable carried by the guide bars, and means for rotating the said shaft.

3. In a hay stacker, the combination with a base, guide bars located at the front and rear of said base, extending from its left-hand side upward beyond the right-hand side, the said guide bars being provided with longitudinal slots closed at the top and open at the bottom, shoes secured to the bottoms of the said guide bars, which shoes are provided with open bearings which enter the slots in the guide bars, a shaft extending in direction of the front and rear of the machine, an outer operating drum, and auxiliary drums secured to the said shaft between its ends, of a fork conveyer consisting of a body portion and series of teeth extending in direction of the left and the right-hand sides of the machine from its body portion, the teeth of the two series being at angles to each other and the teeth of the outer series being receiving teeth and the teeth of the inner series discharging teeth, guide arms secured to the outer faces of the outer teeth of the receiving series, which guide arms consist of a base member parallel with said teeth, and an upright member parallel with the guide bars, rollers at the upper ends of the said upright members of the said arms, pins extending outward from the said guide arms at the junction of their members, said pins being passed through the slots 22 in the guide bars adjacent to the lower edges of the slots therein, which rails are engaged by the said friction rollers, and which rails also have their upper ends inclined and carried beyond the right-hand side of the guide bars, a cable attached to the larger drum, being adapted for attachment also to a draft device, and cables secured one to the outer end of the base member of each guide arm, which cables are connected at their opposite ends with the smaller drums on the said shaft, and friction pulleys engaging the said cables at points between their ends.

In testimony whereof I have signed my name to this specification in the presence of two subscribing witnesses:

DAVID D. OGILVIE.

Witnesses:
J. M. TABER,
E. J. L. TABER.